(12) United States Patent
Welsh et al.

(10) Patent No.: US 7,164,130 B2
(45) Date of Patent: Jan. 16, 2007

(54) SIGNAL ENHANCEMENT MODULE

(75) Inventors: Dan Welsh, Encinitas, CA (US); Joel Kindem, San Diego, CA (US); Michael Gurley, San Diego, CA (US); Richard L. Conwell, Del Mar, CA (US)

(73) Assignee: Digirad Corporation, Poway, CA (US)

( * ) Notice: Subject to any disclaimer, the term of this patent is extended or adjusted under 35 U.S.C. 154(b) by 350 days.

(21) Appl. No.: 10/782,730

(22) Filed: Feb. 18, 2004

(65) Prior Publication Data

US 2004/0173750 A1 Sep. 9, 2004

Related U.S. Application Data

(60) Provisional application No. 60/448,200, filed on Feb. 18, 2003.

(51) Int. Cl.
*G01T 1/00* (2006.01)

(52) U.S. Cl. .............. 250/336.1; 250/370.09; 250/369

(58) Field of Classification Search ........... 250/336.41, 250/363.01, 363.02, 363.03, 363.07, 363.09, 250/370.01, 370.07, 370.08, 370.09, 336.1
See application file for complete search history.

(56) References Cited

U.S. PATENT DOCUMENTS

| | | | | |
|---|---|---|---|---|
| 3,932,757 | A * | 1/1976 | Hounsfield | 378/4 |
| 4,920,548 | A * | 4/1990 | Gaussa et al. | 376/255 |
| 5,452,084 | A * | 9/1995 | Mitchell et al. | 356/301 |
| 5,608,221 | A | 3/1997 | Bertelsen et al. | |
| 6,057,551 | A | 5/2000 | Tararine | |
| 6,222,193 | B1 * | 4/2001 | Thurston et al. | 250/370.01 |
| 6,242,745 | B1 | 6/2001 | Berlad et al. | |
| 6,297,506 | B1 * | 10/2001 | Young et al. | 250/369 |
| 6,388,258 | B1 | 5/2002 | Berlad et al. | |
| 2002/0070365 | A1 * | 6/2002 | Karellas | 250/581 |

* cited by examiner

*Primary Examiner*—David Porta
*Assistant Examiner*—Faye Boosalis
(74) *Attorney, Agent, or Firm*—Fish & Richardson P.C.

(57) ABSTRACT

Events of interest are detected within a gamma ray detection system. Characteristics of undesired signals, including a multiplicity of events within the signal, a density of events within the signal, and other aspects are determined. The signal is filtered based on its expected characteristics. A signal which does not have the expected characteristics is rejected, and an image is formed that excludes those rejected signals.

31 Claims, 6 Drawing Sheets

SIGNAL ENHANCEMENT MODULE

CROSS-REFERENCE TO RELATED APPLICATION

This application claims benefit of the priority of U.S. Provisional Application Ser. No. 60/448,200 filed Feb. 18, 2003 and entitled "Signal Enhancement Module."

TECHNICAL FIELD

The disclosed system relates to electromagnetic radiation imaging systems, and more specifically to filtering signals produced from an electromagnetic radiation imaging system, based on filtering criteria that imply that the signals detected do not originate from or pass through the object being imaged.

BACKGROUND

Detector systems, such as gamma ray detectors, may be sensitive to non-physical events that cannot be discriminated on the basis of the signals from a single pixel. These events cause noise in the system.

The signal generated by an individual gamma ray is very small—of the order of a few hundred to a few thousand electrons. Therefore, relatively small extraneous signals may be detected as gamma rays and erroneously registered.

Vibration in solid-state gamma cameras is one example of a phenomenon that may cause the generation of electromagnetic noise signals that are detected as one or a plurality of events of interest. Analogously, electrical discharges, including discharges driven by potential differences below 5 volts, may generate non-physical events. Impingement of extraneous high-energy particles such as cosmic rays may also cause errors. As a result of Compton scattering into multiple detection elements, a high-energy gamma ray striking the radiation-sensitive surface of a SPERIS can directly produce signals in multiple channels. The gamma ray can also produce noise signals in neighboring channels through coupling by electrical parasitics.

SUMMARY

A technique of filtering events from an electromagnetic detector is described. According to one aspect, thresholds are set based on expected amounts of electromagnetic radiation impinging on a detector. The output signal from the detector is filtered based on the threshold, to reject signals that are based on undesired stimuli.

In one aspect, different sources of noise are characterized according to the quantities of data that will be generated by the detector system in response to signals caused by each source of noise.

In an embodiment, the detector is a segmented detector gamma camera, used in the medical imaging application the filter is used to determine. The present disclosure describes filtering from the events detected by a segmented detector, pulse counting electromagnetic radiation imaging system or SPERIS, events that cause a plurality of individual events concurrent in time. The techniques may be especially useful for events that cannot be distinguished on the basis of primary particle energy, precise time coincidence or the geometric relationship between the individual events caused by the event.

The filter, or signal enhancement module, discriminates against these events by rejecting signals that exceed definable thresholds in terms of their concurrence in time and one or a plurality of the quantity, global density, local density and energies of the individual events caused by the events.

DESCRIPTION OF DRAWINGS

These and other features and advantages of the invention will become more apparent upon reading the following detailed description and upon reference to the accompanying drawings.

DETAILED DESCRIPTION OF THE INVENTION

The scope of the techniques disclosed herein is intended for use specifically in electromagnetic radiation imaging systems, "ERIS", that produce images by detection of photons such as X-rays and gamma rays. In addition, these techniques are intended for use with an ERIS that comprise segmented detectors and operate in a pulse counting mode. Examples of these systems include commercial gamma ray imaging systems manufactured by Digirad Corporation for gamma ray imaging in nuclear medicine, and some commercial X-ray imaging systems.

Figure 6:
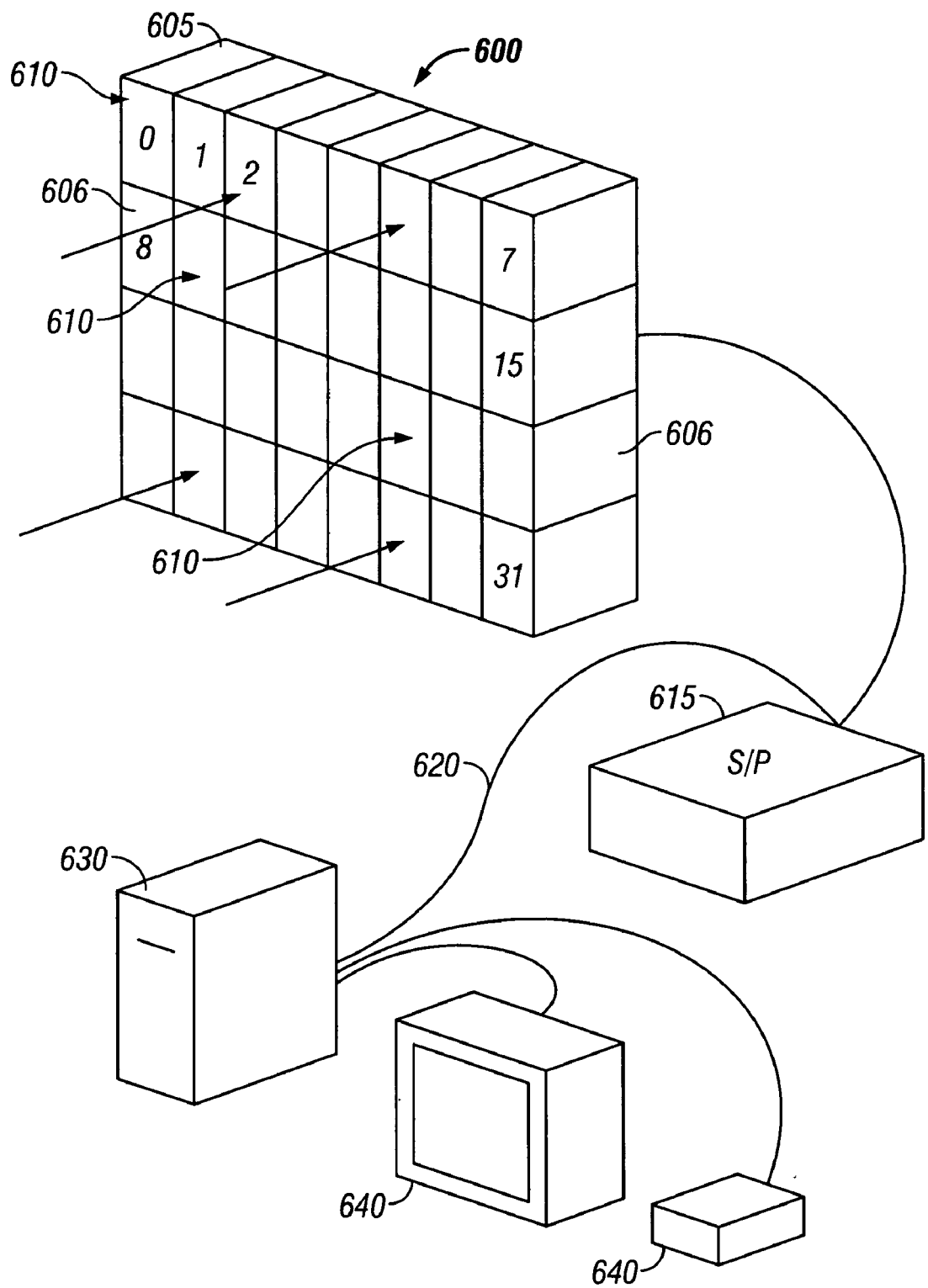
FIG. 6 shows an exemplary electromagnetic radiation imaging system.

A segmented detector, pulse counting electromagnetic radiation imaging system, or SPERIS 600, is shown in FIG. 6. The device typically has four basic subsystems:(1) one or a plurality of detector modules 606 that capture the raw signals 610; the totality of the individual detector modules being denoted the detector 605, (2) a signal processing subsystem 615 that receives information from the detector 605, and converts the information from the detector modules into a form 620 suitable for further processing in a computer, (3) a computer 630 that receives the data 620 from the signal processing subsystem 615, then generates and may enhance one or a plurality of final images and may also calculate the values of attributes of the object imaged, and (4) one or a plurality of output devices 640 such as computer monitors and printers that present the final images and other data in desired formats.

The minimum requirements for pulse counting, segmented detector imaging systems are that the system be able (1) to detect the impingement of particles of radiation of the type being imaged on one or a plurality of radiation-sensitive regions, (2) to determine the position of impingement of one or a plurality of particles on said radiation-sensitive surface or surfaces. In many cases, it is also desirable to determine the time, with a selected precision, at which said particle or particles impinge on said radiation-sensitive surface or surfaces.

These devices are intended to detect a specified kind of radiation, e.g., in the disclosed embodiment, gamma rays. Typically the detector module 605 of an electromagnetic radiation imaging system will also, however, receive energy, e.g., particles of radiation with properties other than those of the particles whose image is being generated. Signals generated by this undesired radiation may appear as noise in an image.

The detection of any phenomenon that causes the imaging system to generate a signal is referred to as an event. An event actually caused by the particle or plurality of particles of the type and properties being imaged, and originating from or passing through the object being imaged, is denoted an event of interest "EOI". Any event other than an EOI is considered to be a non-physical event or NPE.

Typically, SPERIS discriminate between individual particles on the basis of energy. This function is often performed within the detector module by such operations as pulse shaping, peak detection and comparison of peak value to a threshold energy reference. Some discriminate between a plurality of particles on the basis of time coincidence, and some discriminate on the basis of the geometric relationship between a pair of particles. A particular ERIS may employ any combination of these three discrimination criteria. For example, in Anger-type gamma ray imaging systems used in nuclear medicine, light generated in a continuous single crystal sheet scintillator is collected by a plurality of photomultiplier tubes. Because Anger cameras employ a single sheet scintillator, they are not SPERIS. A gamma ray impinging on the scintillator sheet generates a large number of photons that spread throughout the crystal, causing all the phototubes to detect a signal simultaneously. Signals that do not cause simultaneous detection of light by all the photomultiplier tubes are treated as non-physical events. Similarly, in positron emission tomography or PET, the EOI is the simultaneous emission within the patient of two particles of identical, well-defined energy and traveling in diametrically opposite directions. Phenomena not meeting these criteria are rejected as NPE.

Detection modules for SPERIS comprise a plurality of individual detector elements, often called pixels or channels. Each individual channel produces signals in response to the impingement of a particle or particle. For example, the detector module of a solid-state, segmented-detector gamma ray imaging system used in nuclear medicine may comprise an array of solid-state detector elements and may perform some signal processing functions. The array typically comprises a large number of pixels and may comprise a plurality of smaller arrays. The individual detector elements may comprise a direct-conversion detector, such as cadmium zinc telluride, which generates electrical signals in response to absorption of a particle within the material, or an indirect-conversion detector such as a scintillator and a photodiode. Note that the Anger camera discussed below comprises a plurality of photomultiplier tubes, but only one scintillator crystal and is therefore not a segmented detector system The disclosed embodiment assumes a solid-state, pulse counting, segmented detector gamma ray imaging system used in a medical imaging application, as shown in FIG. 6. The detector module 605 has a 4,096 element (channel) segmented detector array distributed in a 64 element by 64 element rectangular array covering an area of 20 cm by 20 cm. Other imaging systems, however, could be alternatively used.

The detector array 605 is subdivided physically into 32 modules 606, each incorporating 128 contiguous channels. Alternatively, modules may be defined electronically rather than physically.

In the embodiment being discussed, each module such as 606 is assigned a unique number from 0 to 31. The channel numbers in each module are assigned sequentially as 128 consecutive integers. Channels 0 through 127 are assigned to module 0, channels 128 through 255 to module 1, continuing up to module 31, to which channels 3,968 through 4,095. In any given embodiment, the numbering of modules and channel numbers is arbitrary.

The signal processor 615 performs an energy analysis of the signal from each channel and recognizes as events only those pulses corresponding to energy greater than a specified minimum energy. It will be seen below that energy filtering by this method is useful in identifying DE caused by cosmic gamma rays.

The techniques disclosed herein are also applicable to events discriminated in energy according to other criteria. In these embodiments, the logical flow for distinguishing between valid data and those associated with distributed events may differ from that discussed below.

The gamma camera may employ a serial readout scheme in which the channels are read in ascending numerical order, and data are output only from those channels that have detected an event since the end of the previous readout cycle. Reading a channel that has detected a gamma ray requires 2.67 µs, and reading a channel that has not detected an event requires 40 ns. Therefore, if all channels detect a gamma ray, reading out the entire array requires 10.9 ms. Other embodiments may employ parallel readout of data from the individual channels.

In current clinical gamma ray imaging applications, the flux of gamma rays emanating from the patient and striking the detector array will not exceed 200 gamma rays per $cm^2$ per second. At this flux, the average count rate per channel corresponds to less than 0.2 events per readout cycle and to less than 800 total counts per readout cycle. Distributed events such as vibration, electrical discharge, Compton scattered cosmic gamma rays and individual gamma rays coupling, through electrical parasitics, into neighboring channels typically produce false events detected in one readout cycle in multiple channels physically located near each other, but not necessarily contiguous in channel number, or in patterns that are visible in the image but are not amenable to being described by one or a plurality of geometric relationships. These false events in multiple channels may create a local areal count density over a set of physically contiguous channels significantly exceeding the expected count density of less than 200 events/cm2-second. In addition, vibrational DE may produce such elevated local areal count densities over more than one successive readout cycle.

One occurrence of noise phenomena typically results in detection of events in a plurality of channels within the time required to read out all of the individual channel signals. Therefore events produced by these phenomena are denoted distributed events or DE. Distributed events typically cannot be discriminated against simply on the basis of primary particle energy. Scattering of cosmic rays distributes the original energy of the cosmic ray over a plurality of interactions with multiple pixels. In the case of distributed events caused by vibration or electrical discharge, there is no primary particle. There is no specific geometric relationship between the locations of individual channels that detect individual events caused by a distributed event.

Therefore, in SPERIS, it is desirable to discriminate against multiple events caused by a DE and not identifiable simply by primary particle energy, time coincidence, a specific geometric relationship between a plurality of events, or by any combination of these criteria.

Distributed events are characterized by time concurrence of events in the sense that they cause multiple invalid events to be detected during one readout cycle. The individual events are not necessarily simultaneous within a short time frame of the order of nanoseconds to microseconds. In the embodiment described below, discrimination based on time concurrence is implicit, because the filter processes data acquired during one readout cycle. Other embodiments may include explicit discrimination on the basis of time concurrence.

In many cases, events resulting from distributed events cannot be discriminated against on the basis of the detected energy of events in individual channels. Although a cosmic gamma ray has a well-defined energy, scattering of the cosmic ray causes it to release only a portion of its initial energy in any single channel. In addition, the cosmic ray may not release all of its energy within the detector channels, so that summing the energy of all the events associated with the cosmic ray typically will not yield the initial energy of the ray. The events associated with the cosmic gamma ray, however, typically will have an average energy significantly greater than the energy of the event of interest or EOI.

Techniques are disclosed for detecting false events resulting from a distributed event on the basis of the global count density, local count density, average energy of detected events, and time period of detection of false events. This technique can be implemented in hardware, software or firmware within the signal processing subsystem 615 or elsewhere in the imaging system. For brevity, this is described as a blink filter.

Figure 1:
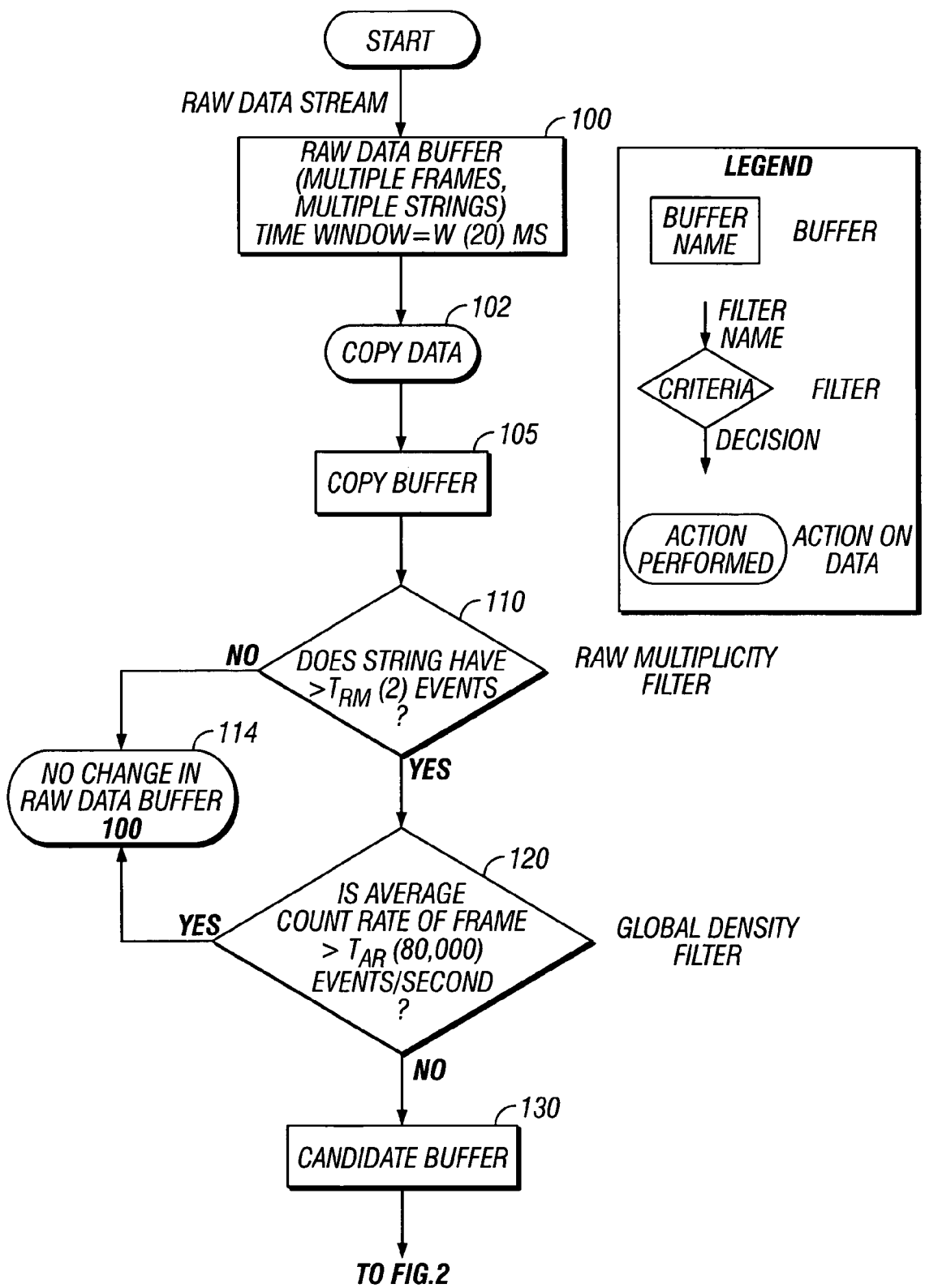
FIG. 1 depicts a decision tree for processing of data in the raw data buffer and copy buffer by the raw multiplicity filter and the global density filter, including the assignment of data to the candidate buffer.

The process follows the flowchart, beginning with FIG. 1. The flowchart of FIG. 1 may be executed in signal processor 615. Data read out from a single channel that has detected energy that may represent a gamma ray are incorporated in a data word. The data word identifies the channel number and energy of the event and also includes an "ignore" field, e.g., a bit, which can be set to identify invalid data words. The data word may also include one or more additional fields that can be set to indicate, for example, why a data word was treated as invalid. Initially, before being processed by the blink filter, each ignore bit is set to 0 to identify the event as valid. In other embodiments, the exact format of the data word, the data incorporated in the word, and the valid/invalid identification bit or bits may differ from the embodiment.

The data words from the individual channels are incorporated into a data stream that also includes time words. In the embodiment, time words are inserted into the data stream every 0.5 ms. In other embodiments of a blink filter, one or more of the exact format of the data word, the data incorporated in the word, the valid/invalid identification code, and other characteristics of the data word may differ from the structure of the data word of the embodiment disclosed.

The data stream from the readout of one detector module, including any time words that may be inserted during the readout of the module, are assembled into a string. In the serial readout of this embodiment, the strings from the modules are read out and inserted into the output data string in order of increasing module number. The transition from one readout cycle, or frame, is identifiable in this embodiment by detecting that the channel number of the first data word of a later readout cycle will be lower than the last data word of an earlier readout cycle.

At 100, the raw data stream first is loaded into a raw data buffer that holds all the data output from the detector module during a time window of W milliseconds. The time window of the embodiment is 20 ms. In all the figures herein, the default values of parameters in the embodiment of the example are shown in parentheses. The raw data buffer therefore contains data from multiple frames and, as a consequence, multiple strings.

Next, a copy of the data in the raw data buffer is made at 102 and placed within a copy buffer 105 and all further filtering operations employ data in the copy buffer created at 105.

The data in the copy buffer 105 are first analyzed by a raw multiplicity filter at 110. This analyzes the data from one module in one readout, denoted a string, based on the number, or raw multiplicity, of events in that string. Frames in which all strings which have raw multiplicity below a threshold value $T_{RM}$ (default value=2) are assumed to be valid, and flow passes to 114, representing no changes being made in the corresponding data in the raw data buffer. 100. All events in these frames will have an ignore bit of zero and, unless the ignore bits of one or more events are changed to 1 in subsequent steps, will be included in an image.

Frames incorporating one or more strings with a raw multiplicity greater than $T_{RM}$ are candidates for analysis as distributed events, or blinks, and are further analyzed by a global density filter 120.

The global density filter 120 determines if the average count rate in a frame including a candidate string is greater than a high count rate threshold $T_{CR}$ (default value=80,000) counts per second. Frames with average count rates greater than $T_{CR}$ can be expected to have multiple strings whose raw multiplicity exceeds $T_{RM}$. Therefore these frames are treated as valid, and flow passes to 114, which leaves data for these frames are left unchanged in the raw data buffer 100. Frames with average count rates less than $T_{AR}$ and including strings with a raw multiplicity greater than $T_{RM}$ are blink candidates and are copied to a candidate buffer 130 that holds the data from one frame.

Figure 2:
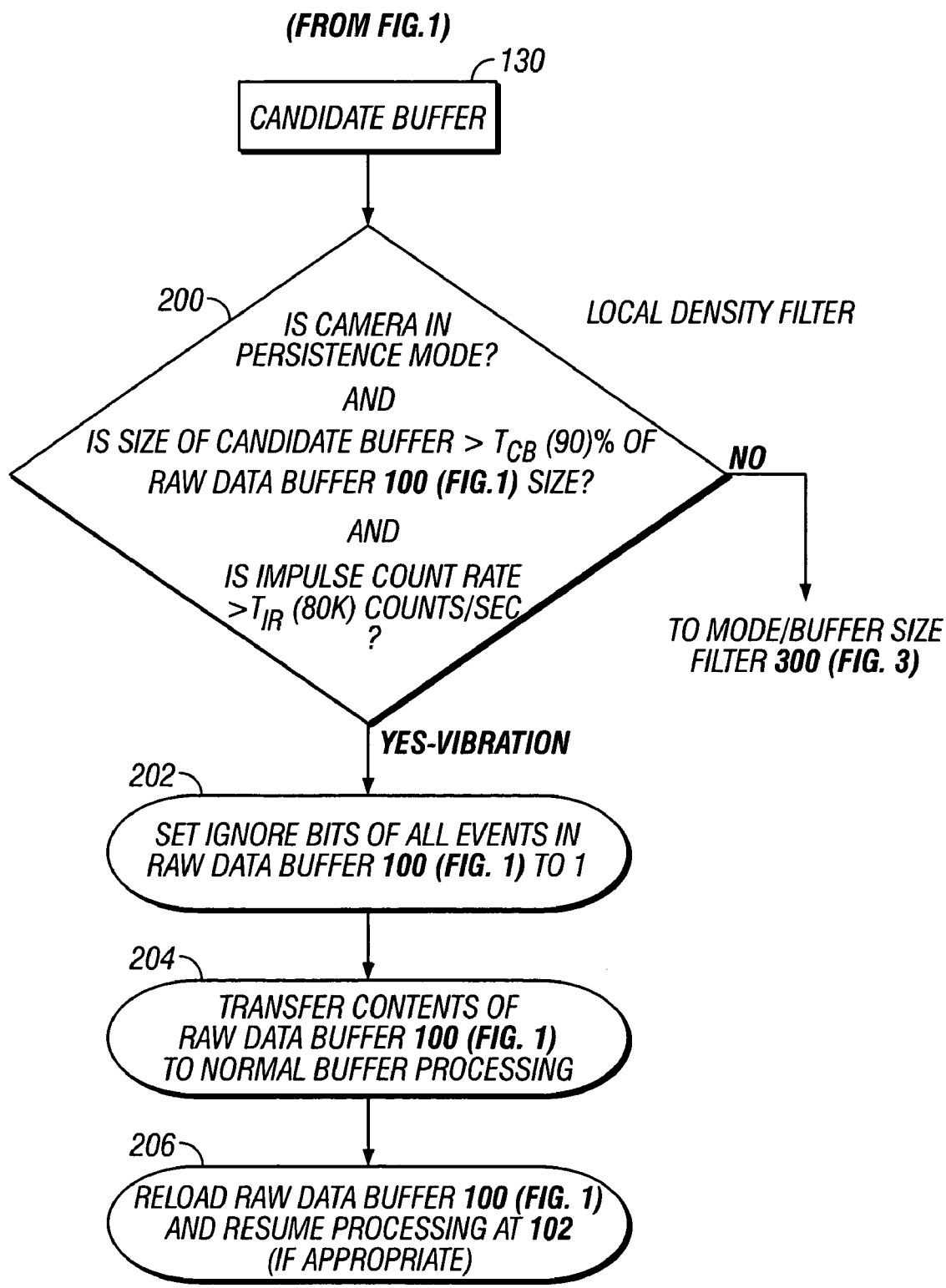
FIG. 2 illustrates data processing performed by the local density filter.

FIG. 2 illustrates the further analysis of data from the candidate buffer 130 using a local density filter shown as 200. The local density filter 200 determines if the camera is in persistence mode, in which data from frames read out over a period of $T_{PM}$ (default value=250) and therefore including a plurality of frames/milliseconds are averaged on a channel-by-channel basis in the final image. If the camera is in persistence mode, images of invalid data from one frame will be averaged into the image data for the whole period $T_{PM}$. Therefore, deleting the data from the all the frames stored in the Raw Data Buffer 100 will improve the quality of the final image. When the camera is in persistence mode, the local density filter 200 discriminates against vibrational distributed events.

Typically, vibrational events will produce a high density of false events, and will be associated with a high local count rate in one or a plurality of modules. Therefore, they increase the size (number of data words) of the data in the candidate buffer 130.

When the camera is in persistence mode, the local density filter determines if the size of the data in the candidate buffer 130 is greater than a threshold of $T_{CB}$ (default value=90) percent of the size of the raw data buffer 100 and if the count rate in an individual module, denoted the impulse count rate, is greater than a threshold $T_{CR}$ (default value=80,000) counts per second. If the camera is in persistence mode and both of these criteria are true, the data in the entire raw data buffer are marked as invalid at 202 by setting the ignore bit on all events in the raw data buffer. The data in the raw data buffer 100 are transferred at 204 to the normal buffer processing system, which excludes these data from inclusion in the final image. The raw data buffer 100 is then reloaded at 206, and if appropriate, copied at 102 into the copy buffer 105. The filter then proceeds to analyze the newly loaded data as above. If the data in the frame do not meet all of these criteria, the data are then analyzed by a mode/buffer size, or MBS, filter 300. In the embodiment, rejection of vibrational events in persistence mode is performed in all cases. For all other types of invalid events, the filter can be turned on or off as desired.

Figure 3:
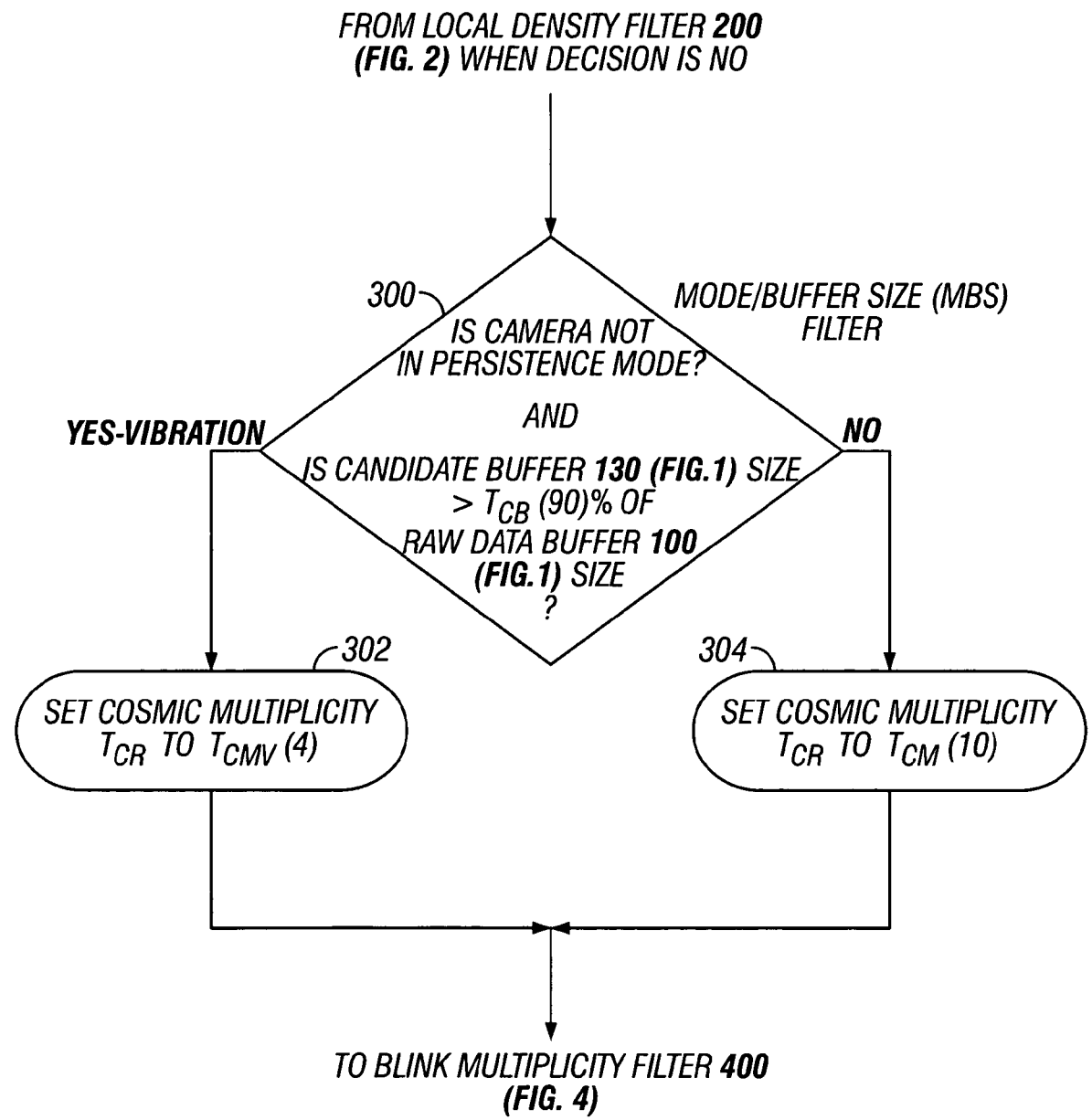
FIG. 3 depicts the decision tree for processing of data by the mode/buffer size (MBS) filter.

Analysis of data by the MBS filter 300 is shown in FIG. 3. If a vibrational DE has occurred, there will be a large number of events in the frame and therefore the size of the candidate buffer 130 is expected to be large. The MBS filter 300 checks to determine if the candidate buffer size is greater than a threshold $T_{NP}$ (default value=90) percent of the size of the raw data buffer 100 the data are treated as being affected by a vibration. In this case, a string from an individual module is likely to contain more invalid events than the raw multiplicity threshold $T_{RM}$.

The data in the string are next analyzed to determine characteristics that would suggest that the DE was caused by a cosmic ray, or was the result of another phenomenon such as vibration or an electrical discharge. Distributed events caused by all such other phenomena are denoted blinks. Because the data in a frame affected by vibration are likely to contain multiple invalid events, the threshold $T_{CR}$ for the number of events in a string associated with a cosmic ray is set to a low value $T_{CMV}$ (default value=4) at 302 to subject a high percentage of strings for further analysis.

If the data in a frame are unaffected by vibration, a cosmic ray striking a module can be expected to cause a substantial number of events in a string from that module. Accordingly, the cosmic multiplicity threshold $T_{CR}$ is set to a higher value $T_{CM}$ (default value=10) at 304.

All further analysis of data is based on the content of strings rather than entire frames.

Figure 4:
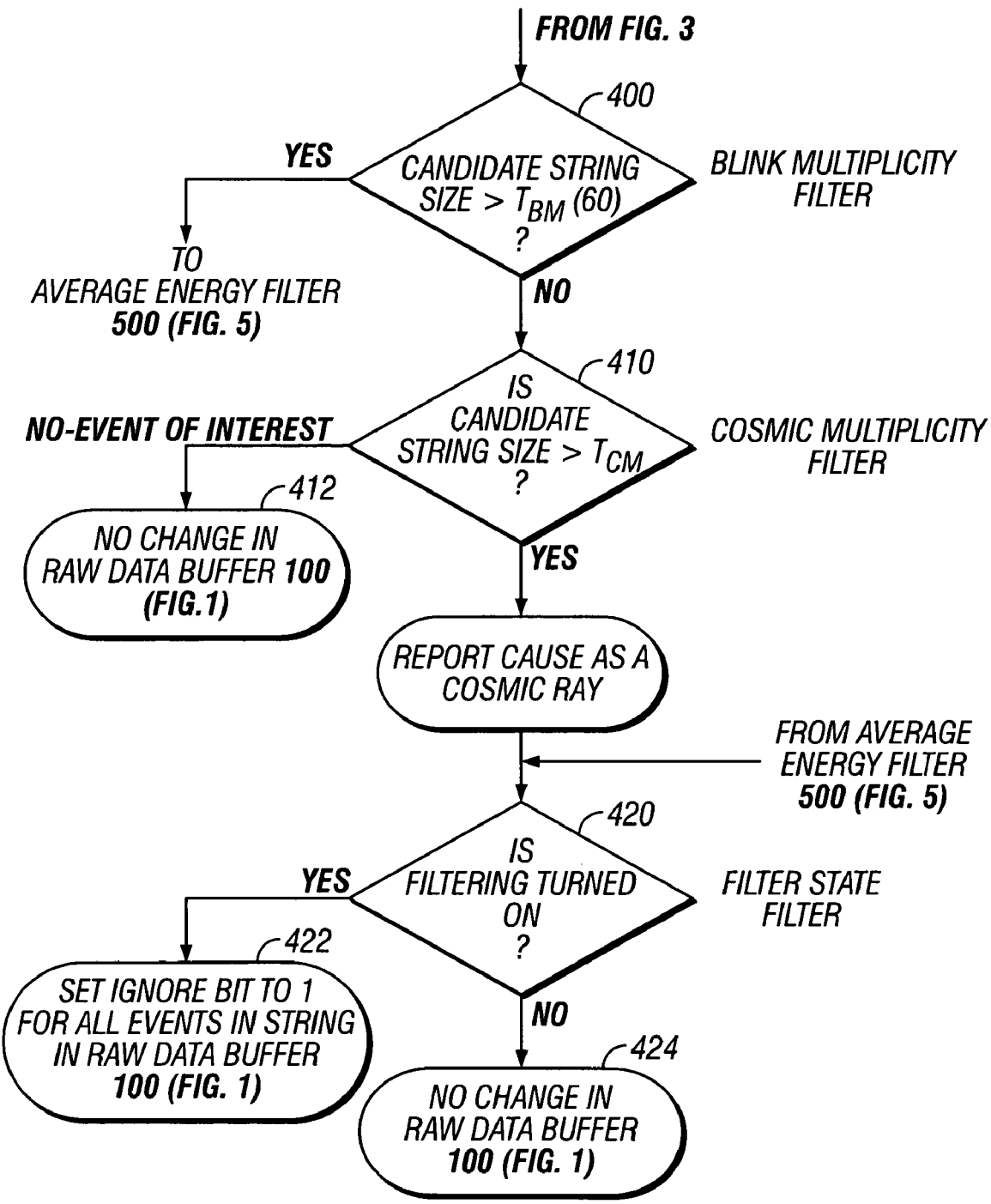
FIG. 4 shows a decision tree of the blink multiplicity filter, cosmic multiplicity filter and the filter state filter.

FIG. 4 shows processing the data from the string being processed using a blink multiplicity filter 400. Strings with a size greater than the threshold $T_{BM}$ (default value=60) are candidates for DE associated with cosmic rays and are assigned for processing in an average energy filter 500 shown in the flowchart of FIG. 5. Strings of shorter length are also related to DE caused by cosmic rays and are assigned for processing to a cosmic multiplicity filter 410.

If a candidate string contains more events than the cosmic multiplicity threshold $T_{CR}$ set earlier (see FIG.3), the string is treated as having been caused by a cosmic ray. The string is reported as a cosmic ray at 412 and then processed by a filter mode filter 420. If the camera has been set so invalid data are to be filtered, the string is marked for rejection at 422 by setting to 1 the ignore bits on all events in the corresponding string in the raw data buffer. If filtering is turned off, the string is treated as valid and no change in the raw data buffer at 424.

If the candidate string contains from 0 to $T_{CR}$ events, the string is treated as valid and no change is made in the raw data buffer at 412.

Figure 5:
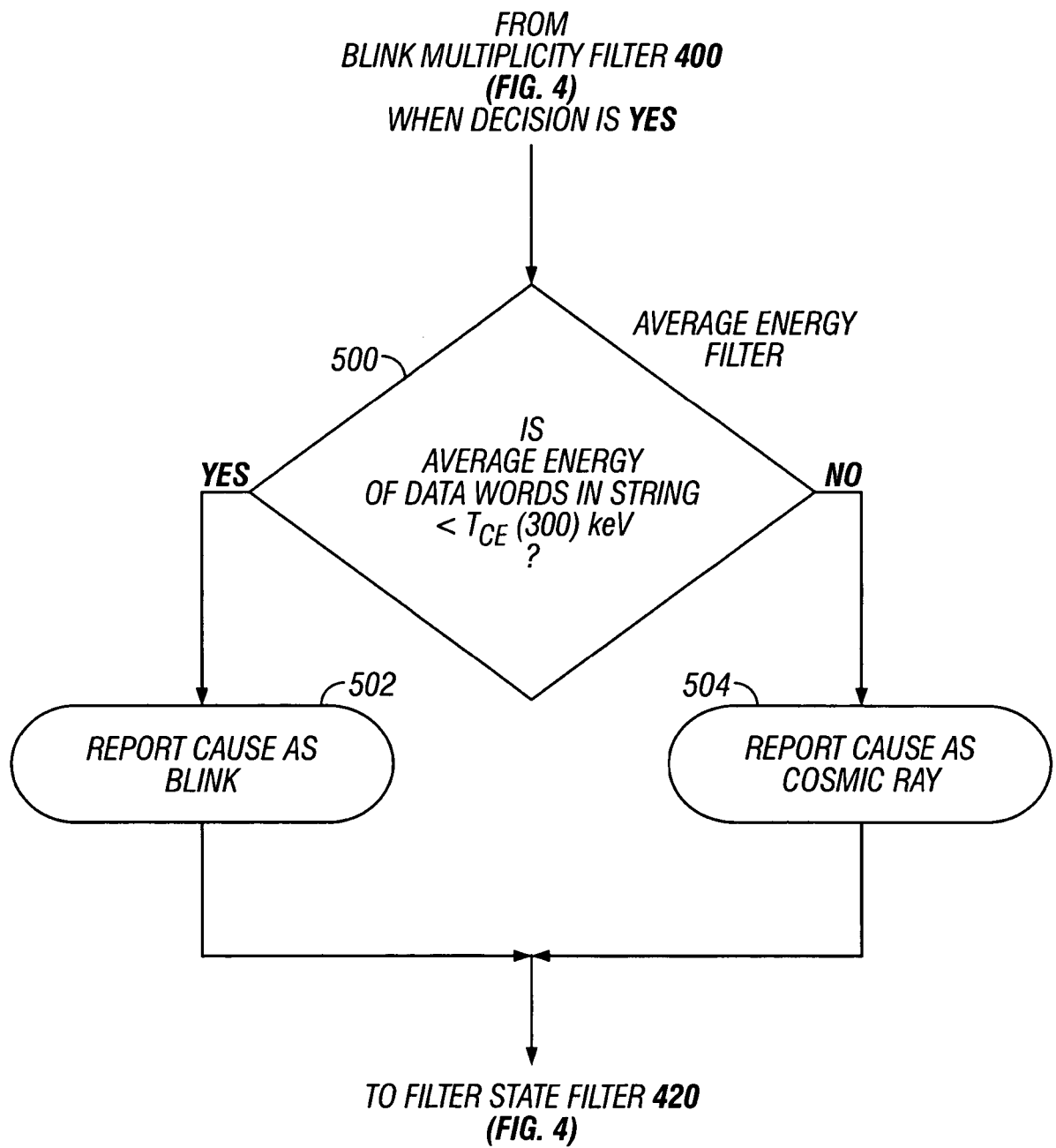
FIG. 5 illustrates a decision tree of the average energy filter.

As shown in FIG. 4, candidate strings that have been analyzed previously by the blink multiplicity filter 400 and have a string size greater than the blink multiplicity threshold $T_{BM}$ have been sent to an average energy filter 500, whose actions are depicted in FIG. 5. The events in such strings have previously been treated as having a cause other than vibration. The remaining task of the signal enhancement module is to determine if the distributed event was caused by a cosmic ray or some other cause, such as electromagnetic discharge. Distributed events resulting from such other causes are referred to as blinks.

Distributed events caused by a cosmic gamma ray produce a plurality of individual events with detected energies less than the initial energy of the cosmic ray. A substantial fraction of such individual events have a detected energy significantly greater than the energy of the particles being imaged.

The average energy filter 500 determines if the average detected energy of the events in the string being analyzed falls below a cosmic energy threshold of $T_{CE}$ (default value=300) keV. If the average energy of the detected events in the string is below $T_{CE}$, the cause of the events in the string is treated as other than a cosmic gamma ray and is reported as a blink at 502. Otherwise, the cause of the events in the string reported as a cosmic ray. In both cases the events in the string are invalid.

Following assignment of a cause for the events in each string by the average energy filter 500, the string is processed by the filter state filter 420. If filtering has been turned on, the string is marked for rejection at 422 by setting to 1 the ignore bit of all bits in the corresponding string in the raw data buffer 100. Otherwise, at 424 no change is requested in the raw data buffer 100.

When processing of all the data in the raw data buffer 100 by the signal enhancement module has been completed, the contents of the raw data buffer 100 are transferred into the normal data processing subsystem, where strings reported as being invalid are excluded from the data incorporated into the final image.

If there are more data to be processed by the signal enhancement module, the raw data buffer 100 is refilled and processing by the signal enhancement module continues at 102.

A number of embodiments have been described. Nevertheless, it will be understood that various modifications may be made without departing from the spirit and scope of the invention. Accordingly, other embodiments are within the scope of the following claims.

For example, the above has described the filtering being carried out in software in the computer 630, however this could also be done in hardware, in firmware, or in other processing systems. In addition, while the above has described using this technique for gamma radiation, it could also be used in any other kinds of energy detection.

Also, while the above has described numerous different filters, it should be understood that the disclosure contemplates different combinations of these filters, which may include fewer than all the filters or even a single one of the filters being used to set the detection parameter.

The embodiment specified one or a plurality of criteria for each of the filters. Other embodiments may employ none or a subset of the specified criteria and may employ one or a plurality of other criteria to perform the desired function. In addition, one or more filters with multiple criteria may be separated into a plurality of other filters. Also, a plurality of filters that collectively perform one or a plurality of functions may be combined to form one or a plurality of other filters that will perform the same set of desired functions.

What is claimed is:

1. A method, comprising:
   storing a signal indicative of a detection over a specified length of time by an electromagnetic detector in a buffer;
   comparing said signal to at least one criterion, said at least one criterion representing a characteristic of a signal, said characteristic indicative of whether the signal resulted from detection of a desired electromagnetic wave as being rejected and indicating a signal when said comparing indicates that the signal did not result from detection of the desired electromagnetic wave, wherein said comparing comprises determining a multiplicity of events within the signal in the buffer, and rejecting the signal if the number of events is outside a specified threshold.

2. A method as in claim 1, wherein said signal is indicative of a gamma ray detection by a gamma ray detector.

3. A method as in claim 2, wherein said criterion includes a threshold based on expected amounts of gamma ray detection during a specified procedure.

4. A method as in claim 3, wherein said comparing comprises using a raw multiplicity filter, to reject signals when they do not have more than a specified number of events within a specified time.

5. A method as in claim 3, wherein said comparing comprises using a global density filter to reject signals when they do not have more than a specified number of events in a specified time period.

6. A method as in claim 3, wherein said comparing comprises using a local density filter to reject strings in a signal that have more than a specified number of events in a specified time.

7. A method as in claim 3, wherein said comparing comprises using a raw multiplicity filter to reject signals when they have a size greater than a specified amount.

8. A method as in claim 3, wherein said comparing comprises using an average energy filter that rejects signals based on a comparison to a specified average energy threshold.

9. A method as in claim 2, wherein said comparing comprises comparing the signal to a criterion that represents vibrational energy.

10. A method as in claim 2, wherein said comparing comprises comparing the signal to a criterion that represents a cosmic ray.

11. A method as in claim 2, wherein said comparison comprises comparing the signal to a plurality of criterion that represent both vibrational energy and a cosmic ray.

12. A method as in claim 1, wherein said storing a signal comprises storing the signal in a buffer along with an associated signal that represents whether the signal is complete.

13. A method as in claim 1, further comprising forming an image and excluding rejected signals from said image.

14. A method as in claim 1, further comprising initially associating a second signal representing a valid signal with the signal, and using said comparing to change said second signal to a value representing an invalid signal when said comparing indicates that the signal did not result from detection of the desired electromagnetic wave.

15. A method as in claim 14, wherein said second signal is a digital bit.

16. A method, comprising:
obtaining a first signal from an electromagnetic detector, indicative of a detection by the electromagnetic detector;
associating a second signal with the first signal, the second signal having a first value which indicates that the first signal is valid;
processing the value of the first signal, to determine whether the first signal represents a desired event being monitored; and
changing the second signal to a second value when said processing indicates that the electromagnetic detector signal represents an event other than a desired observed event, wherein said processing comprises comparing the signal to a criterion that represents vibrational energy, and changing the value of the second signal to represent an invalid signal when said comparing indicates that the signal represents vibrational energy.

17. A method, comprising:
obtaining a first signal from an electromagnetic detector, indicative of a detection by the electromagnetic detector;
associating a second signal with the first signal, the second signal having a first value which indicates that the first signal is valid;
processing the value of the first signal, to determine whether the first signal represents a desired event being monitored; and
changing the second signal to a second value when said processing indicates that the electromagnetic detector signal represents an event other than a desired observed event, wherein said processing comprises comparing the signal to a criterion that represents a cosmic ray, and changing the value of the second signal to represent an invalid associated first signal, when said comparing detects that the signal represents a cosmic ray.

18. A system comprising:
an electromagnetic detector, having a surface adapted to detect an electromagnetic wave, and producing an output signal indicative of a detection;
a buffer, which stores a length of said output signal over a specified length of time; and
a signal processor, including an electronic filter therein, which processes said output signal in said buffer, using a filter characteristic which represents a multiplicity of events within the signal and that indicates whether the output signal resulted from detection of a desired electromagnetic phenomenon, and indicating signals as being rejected when they did not result from said detection of said desired electromagnetic phenomenon.

19. A system as in claim 18, wherein said electromagnetic detector is a medical gamma ray detector.

20. A system as in claim 19, further comprising an image display which displays an image based on said output signal, including only signals that resulted from detection of the desired electromagnetic phenomenon.

21. A system as in claim 19, wherein said filter characteristic represents a characteristic of incoming cosmic rays.

22. A system as in claim 19, wherein said filter characteristic represents a characteristic of electromagnetic interference.

23. A system as in claim 19, wherein said filter characteristic represents a characteristic of mechanical vibration.

24. A system as in claim 18, wherein said filter characteristic represents a density of events within the signal.

25. A system as in claim 18, wherein said signal processor includes a buffer therein which stores an electronic representation of said output signal, and stores a status signal indicative of whether the output signal is rejected.

26. A signal processor, comprising:
an input portion, receiving a signal from a medical gamma ray detector;
a buffer, which stores a length of said output signal over a specified length of time;
a signal processor portion, including an electronic filter therein which processes said signal in said buffer to reject portions of the signal based on a number of events within the signal that did not result from detection of a desired electromagnetic phenomenon, and produces an image output signal, representing an image based on at least one signal from said image portion which is not rejected by said signal processor portion.

27. A signal processor as in claim 26, wherein said electronic filter rejects signals based on a density of events within the signal.

28. A signal processor as in claim 26, wherein said electronic filter filters out signals which have a characteristic representing incoming cosmic rays.

29. A signal processor as in claim 26, wherein said electronic filter filters out signals which have a characteristic representing electromagnetic interference.

30. A signal processor as in claim 26, wherein said electronic filter filters out signals which have a characteristic representing mechanical vibration.

31. A method, comprising:

determining, in a medical gamma ray system, a dose and number of gamma ray signals which will be applied to a patient;

receiving gamma rays from the patient as applied by the medical camera ray system;

using said dose and number of gamma ray signals to form a filter to filter out portions of the received gamma rays that are outside a range that is based on said dose and number of gamma ray signals determined in said determining.

* * * * *